(12) United States Patent
Kochura et al.

(10) Patent No.: US 9,878,663 B1
(45) Date of Patent: Jan. 30, 2018

(54) COGNITIVE DIALOG SYSTEM FOR DRIVING SAFETY

(71) Applicant: International Business Machines Corporation, Armonk, NY (US)

(72) Inventors: Nadiya Kochura, Bolton, MA (US); Fang Lu, Billerica, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/372,137

(22) Filed: Dec. 7, 2016

(51) Int. Cl.
*B60Q 1/00* (2006.01)
*B60Q 9/00* (2006.01)
*B60W 40/08* (2012.01)

(52) U.S. Cl.
CPC .............. *B60Q 9/00* (2013.01); *B60W 40/08* (2013.01); *B60W 2040/0818* (2013.01)

(58) Field of Classification Search
CPC ........................................................ B60Q 9/00
USPC ........ 340/439, 436, 901, 988, 995; 901/213, 901/301, 469
See application file for complete search history.

(56) References Cited

U.S. PATENT DOCUMENTS

| | | | |
|---|---|---|---|
| 7,126,485 | B2 | 10/2006 | Cece |
| 7,830,265 | B2 | 11/2010 | Power |
| 8,665,099 | B2 | 3/2014 | Mamba |
| 8,742,936 | B2 | 6/2014 | Galley |
| 9,045,074 | B2 | 6/2015 | Hunnings |
| 9,493,118 | B1 * | 11/2016 | Laur ................... B60Q 9/008 |
| 2004/0036601 | A1 * | 2/2004 | Obradovich ........ H04L 61/2553 340/540 |

| | | | |
|---|---|---|---|
| 2007/0041552 | A1 | 2/2007 | Moscato |
| 2013/0325478 | A1 | 12/2013 | Matsumoto |
| 2014/0300458 | A1 | 10/2014 | Bennett |

FOREIGN PATENT DOCUMENTS

| | | |
|---|---|---|
| CN | 103253275 | 8/2013 |
| EP | 2284057 | 2/2011 |
| WO | 2014209157 A1 | 12/2014 |

OTHER PUBLICATIONS

Disclosed anonymously. (2012). Monitor Emotional Intensity Level of Conversation While Driving.
Pittermann, J., Minker, W., Pittermann, A., & Bühier, D. (2007). Problemo—problem solving and emotion awareness in spoken dialogue systems. Intelligent Environments, 447-450bvb.
IBM Patents or Patent Applications Treated as Related.

* cited by examiner

*Primary Examiner* — Tai T Nguyen
(74) *Attorney, Agent, or Firm* — Jeffrey S LaBaw; Feb R Cabrasawan

(57) ABSTRACT

The system gathers a current set of biometric data for a driver of a vehicle from an Internet of Things (IoT) device during a driving phase. The system gathers a set of external factor data from a cloud resource during the driving phase. The system adjusts a threshold value for a first threshold between a normal biometric condition and a first abnormal biometric condition for the driver for a first biometric parameter according to the set of external factor data. The system determines whether the gathered biometric data of the driver is consistent with the normal biometric condition or the first abnormal biometric condition according to the adjusted first threshold value. If the gathered biometric data is consistent with the first abnormal biometric condition, the system performs a selected one of a set of actions to alleviate the first abnormal biometric condition.

20 Claims, 10 Drawing Sheets

COGNITIVE DIALOG SYSTEM FOR DRIVING SAFETY

BACKGROUND OF THE INVENTION

This disclosure relates generally to computer based safety mechanisms. More particularly, it relates to teaching a machine learning system to recognize and ameliorate risk factors relevant to driving safety.

Driver inattentiveness is a major factor in vehicle accidents. It can be caused by many reasons including driver conditions such as sleepiness, sickness, anxiety, stress, distraction and so forth.

The prior art has developed multiple techniques to monitor driver attentiveness and concentration on the driving task. Some of these techniques are mechanical, e.g., relying on a set of grip pressure sensors; when the pressure on any one sensor falls below a predetermined value, an alarm is activated. Sensors on wearable devices can discern the driver is engaged in secondary activities, which may indicate the driver is not satisfactorily involved in the driving process. Other techniques include acquiring driver gaze distribution information to assess the driver's attention on the driving task. For example, when the driver's gaze is lateral, directed to the vehicle interior, rather than on the road or vehicle meter, it is an indication that the driver is inattentive.

In such systems, it is known to use an audible alarm or visual alarm to gain the driver's attention. However, many of the system alarms are repetitive and serve to annoy the driver which may further decrease the driver's attentiveness on the driving task. The repetition can cause some drivers to ignore the alarms and other drivers to disengage the safety feature to eliminate the aggravation.

While a number of computer aided mechanisms for improving driver safety have been proposed in the art, further improvements in such computer aided mechanisms are needed.

BRIEF SUMMARY

According to this disclosure, a method, apparatus and computer program product for driving safety is described. The system gathers a current set of biometric data for a driver of a vehicle from an Internet of Things (IoT) device during a driving phase. The system gathers a set of external factor data from a cloud resource during the driving phase. The system adjusts a threshold value for a first threshold between a normal biometric condition and a first abnormal biometric condition for the driver for a first biometric parameter according to the set of external factor data. The system determines whether the gathered biometric data of the driver is consistent with the normal biometric condition or the first abnormal biometric condition according to the adjusted first threshold value. If the gathered biometric data is consistent with the first abnormal biometric condition, the system performs a selected one of a set of actions to alleviate the first abnormal biometric condition.

The foregoing has outlined some of the more pertinent features of the disclosed subject matter. These features should be construed to be merely illustrative. Many other beneficial results can be attained by applying the disclosed subject matter in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

At a high level, in preferred embodiments of the invention, the present invention provides a Cognitive Driver Dialog System (CDDS) that evaluates the level of cognitive inattentiveness of a driver by engaging the driver in a personalized dialog and evaluating the driver responses. By engaging the driver in the personalized dialog, the CDDS helps the driver to overcome cognitive inattentiveness caused by sleepiness, anxiety, stress and other conditions. For example, involving a person in an engaging conversation would help to overcome a sleepiness condition, while a calming dialog would help the person in a stressed condition. The present invention is an improvement over the prior art as the system assesses the cognitive inattentiveness of the driver caused by internal factors such as the driver's physical conditions as well as external factors such as road conditions, traffic and weather factors and formulates a personalized set of actions to alleviate the driver condition.

Figure 1:
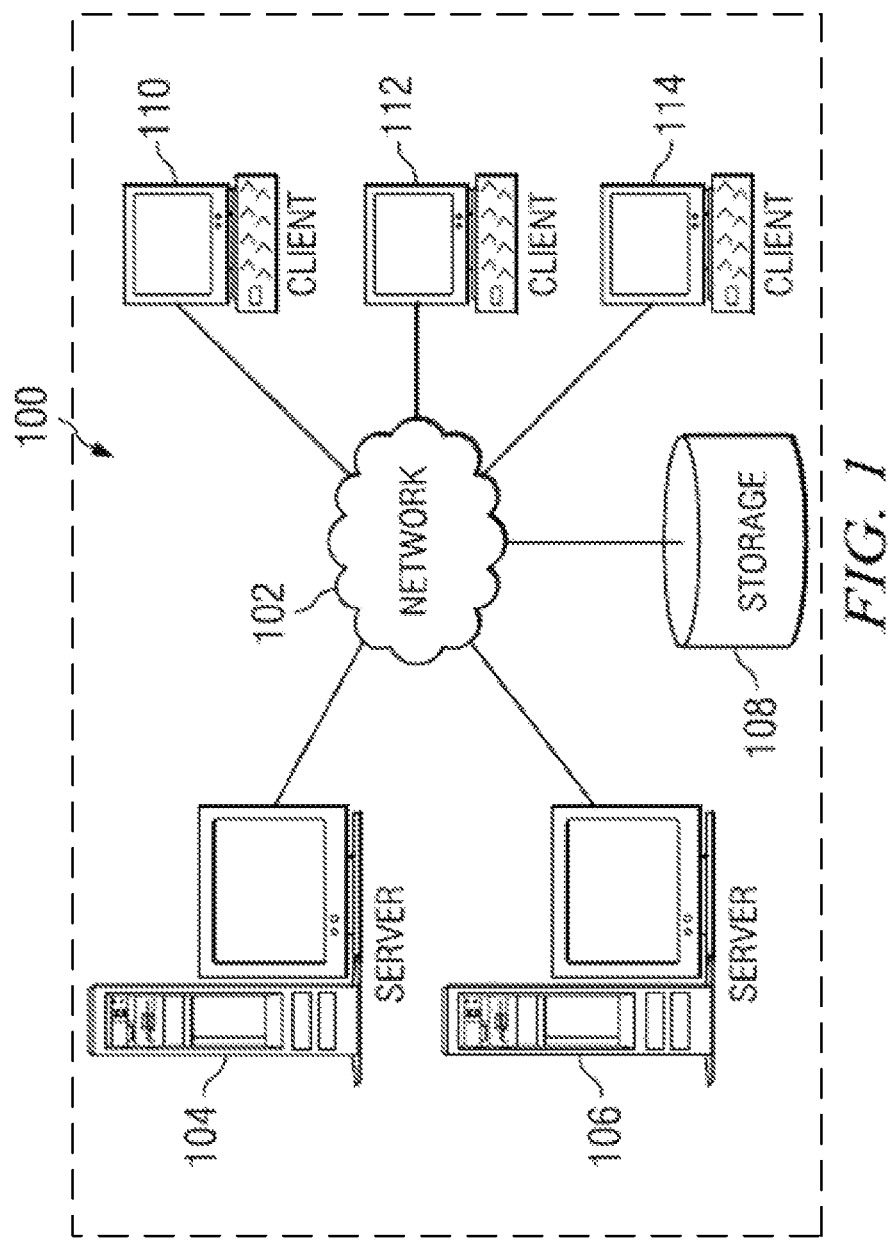
FIG. 1 depicts an exemplary block diagram of a distributed data processing environment in which exemplary aspects of the illustrative embodiments may be implemented.
Figure 2:
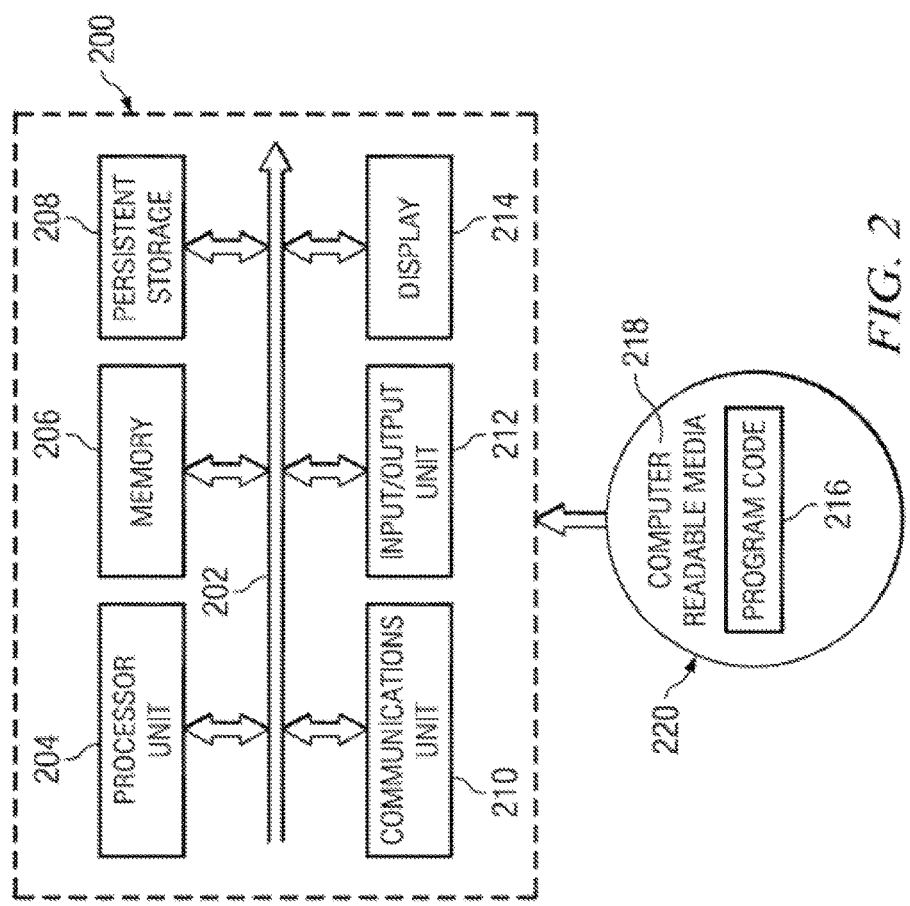
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

For example, a server could be a mainframe computer connected to network 102. Mainframe computer can be, for example, an IBM System z mainframe running the IBM z/OS operating system. Connected to the mainframe could be a mainframe storage unit and a client system. The client system is either a PC connected directly to the mainframe communicating over a bus, or a console terminal connected directly to the mainframe via a display port.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212.

The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C#, Objective-C, or the like, and conventional procedural programming languages such as Python or C. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities.

In preferred embodiments of the invention, internal factors such as driving patterns and driver biometric data are analyzed with external factors such as traffic, road conditions and weather conditions for correlations. In preferred embodiments of the invention, a set of actions, including a dialog with the driver, are presented to the driver if the value for an internal factor crosses a threshold. The threshold for the internal factor is calculated according to one or more of the external factors in embodiments of the invention. These actions are dynamically selected and adjusted based on several factors such as a driver condition derived from the biometrics, a driving pattern and the driver responses to the dialog.

Preferred embodiments of the invention include a Cognitive Driver Dialog System (CDDS) that evaluates the level of cognitive inattentiveness of a driver by engaging the driver in a personalized dialog and evaluating the driver responses. Based on a learning process, the system selects a personalized dialog with the driver according to the biometrics, driving patterns and external factors. Based on the driver's interactions with the dialog, the system continues to assess the driver's level of cognitive inattentiveness and, if needed, suggests a set of actions for safely driving including alerting the driver to his condition and suggestions for ameliorating the condition. By engaging the driver in the personalized dialog, the CDDS helps the driver to overcome cognitive inattentiveness caused by sleepiness, anxiety, stress and other conditions. For example, involving a person in a first engaging dialog would help to overcome a sleepiness state, while a second calming dialog would help the driver in stressed and anxiety states.

In preferred embodiments, driver biometric data before the dialog is used to determine whether the dialog should be initiated, e.g., a driver condition of sleepy; biometric data during the dialog is used to determine whether the dialog has been effective. The driving pattern is another indication of driver inattentiveness.

In the process of evaluating the driver condition and his/her ability for adequate perception of external factors, the Cognitive Driver Dialog System analyzes the responsiveness of the driver on both correctness and timing as well as the speech characteristics.

In embodiments, the thresholds for the biometric condition and driving pattern should be adjusted to account for external factors which may be affecting the driver biometrics and reactions. In other embodiments, the thresholds for biometric condition and driving pattern are adjusted according to data acquired for the individual driver, i.e. how the driver reacts to external factors.

In preferred embodiments of the invention, the system learns and then applies established correlation patterns between traffic, road and weather factors and the driver biometric condition and driving patterns. The correlations are then used to adjust the thresholds between "normal" biometric conditions and "abnormal" biometric conditions as well as thresholds between "normal" driving patterns and "abnormal" driving patterns. Correlation is a measure of how strongly one variable depends on another. For example, the system uses established correlation between the external factors of bad foggy weather and slippery road conditions and the risk or safety of driving. As another example, the system uses correlations between such external factors and the individual driver's own reactions to the external factors. Thresholds are used define the boundaries in set of values at which the decisions are made. For example, system detects the weather and traffic conditions are bad and consequently adjusts the threshold between "normal" and "inattentive" biometric conditions more tightly to account for the greater risk in poor conditions. The system evaluates that the driver condition is mapped to the biometric condition of "inattentive" based on the adjusted threshold. The system applies the above correlation to predict that the risk of driving would exceed the threshold of safety driving for that user in this condition.

As another example, during morning rush hours in city driving frequent stop/start car motions are typical. Thus, a stop/start driving pattern would not be unusual in rush hour traffic, and therefore, not be a cause to start the dialog. In such a case, the system adjusts the threshold so that the start/stop driving pattern does not start the dialog. However, stop/start driving patterns at other times of the day or in rural locations are an indicator of a driver condition and can cause the CDDS to enter a dialog with the driver. The system may have historical data indicating that an individual driver may react to the stop/start driving pattern badly, and the biometric data may indicate an anger condition. Thus, the threshold is adjusted so that the CDDS will start a calming dialog for that driver once the start/stop driving pattern is detected. As another example, the driver may react to rainy and foggy weather factors with a sleepiness condition indicating that an engaging dialog is to be initiated.

In assessing the driver's ability to drive safely, the system considers the external factors, particularly as they apply to the current driver, as additional risk factors or weights applied to the estimated evaluated level of the driver cognitive inattentiveness. Specifically, preferred embodiments of the invention dynamically update the attentiveness thresholds for the particular driver based on external factors and recent activities. It assumes multi-factor estimation of the driver's attentiveness based on the biometric data collected during a data collection stage on various driver conditions and by comparison with real time driver biometric data. The biometric data when driving are analyzed based on the latest information on external factors and recent activities; an evaluation is made whether the attentiveness thresholds should be adjusted based on the external factor and recent activities. For example, the wearable devices collected data during the driver's activities in the gym indicating increased blood pressure and fatigue. Based on that data, the real time awareness thresholds between driver conditions will be updated during a driving stage.

A preferred implementation is based on the integration of various data sources through shared data repository platform such as Internet of Things (IoT) or cloud. The real time data is used to adjust the thresholds from various data sources related to the relevant risk factors. Using a shared data platform, embodiments of the invention provide the ability to generate more accurate and confident estimates for the driver's ability to drive safely. For example, suppose that the system received the latest accident data along the route (external factor) from a cloud provider, and given the currently sensed biometric data, forecasts that the driver anxiety level will be above the stress level that creates a health risk to that driver with a known health condition, e.g., depression, once the driver encounters traffic related to the accident. Responsive this determination, the system initiates a dialog stage with the driver and conducts a calming dialog engaging the person in logical communication. In preferred embodiments of the invention, the system provides additional recommendations to the driver, e.g., suggesting an alternative route or a soothing musical playlist.

Figure 3:
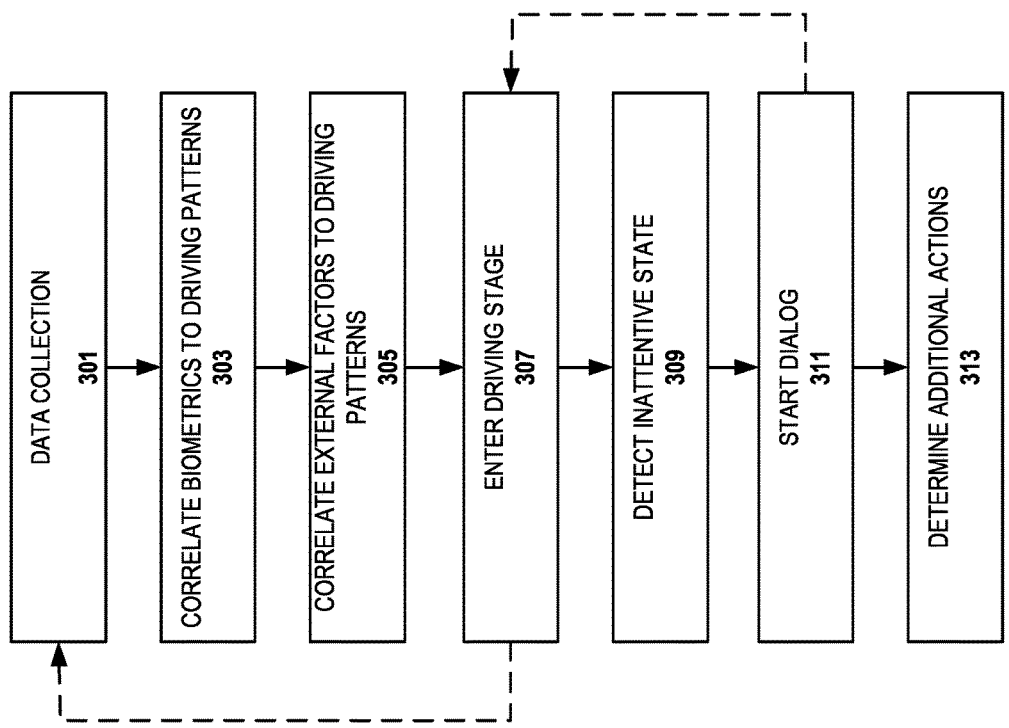
FIG. 3 illustrates a high level flow diagram according to an embodiment of the invention.

A high level flow diagram of the process used in preferred embodiments of the invention is depicted in FIG. 3. As shown, the Cognitive Driver Dialog System (CDDS) implementation has several stages. In a data collection stage, step 301, the CDDS collects biometric data from IoT devise such as wearable computers and devices. Wearable devices collect various biometrical metrics such as pulse, pressure, and body temperature while the driver is in various states during the driving activity such as stressed, sleepy, distracted as well as recent historical activities, e.g., active, in the gym, boring meeting or just awakened. A driver state is called a driver condition in this disclosure. Devices in the vehicle are also used in embodiments of the invention to collect biometric data and external data. These vehicle devices can be considered IoT devices in preferred embodiments as they are connected to other devices by means of Bluetooth or another communications medium. The Internet of Things is the internetworking of physical devices, vehicles (also referred to as "connected devices" and "smart devices"), buildings and other items—embedded with electronics, software, sensors, actuators, and network connectivity that enable these objects to collect and exchange data. External data such as time, weather, road conditions, predicted traffic and actual traffic are gathered in the data collection stage. This stage is discussed in greater detail in association with FIG. 5.

In a first correlation stage, step 303, the CDDS correlates the driver biometric data and recent driver activity to driving patterns. Driving patterns can be classified as belonging to certain states such as: normal state, sleepiness state, erratic driving state, agitated driving state. The driving pattern states are based on an individual profile of the specific driver in the specific car in some embodiments. In other embodiments, the currently sensed individual driver driving pattern is matched to a closest one of a set of generalized pattern profiles of multiple drivers. In yet other embodiments, the generalized driving pattern profiles are used as base driving patterns to start the correlation process, and then the captured driving patterns are used to customize the driving patterns to the individual driver. In preferred embodiments of the invention, the biometric data of the driver are monitored during his/her regular activities: driving, gym, work, sleep and awakening. The CDDS determines whether a recent activity has an effect on the biometric data received while driving and how long that effect may last. In this way, the system establishes a set of "normal" biometric metrics for each recent activity. In preferred embodiments of the invention, the set of normal metrics will identify the biometric ranges for "normal" conditions, as well as stress conditions, sickness conditions, sleepiness conditions, anxiety conditions as well as other categories of conditions. Thresholds which indicate boundaries between driver conditions are calculated in embodiments of the invention. The CDDS will correlate the driving pattern with the biometric condition. This stage is described in greater detail in FIG. 6.

In preferred embodiments of the invention, the condition boundaries between biometric conditions are "fuzzy" as in a fuzzy ruleset or fuzzy logic. That means that the system behavior is operated on fuzzy conditions such as "normal", "extremely tired", "sleepy". In these embodiments, the condition threshold values are mapped to a range of values for the individual driver. As mentioned above, general driver profiles are used in some embodiments and the general fuzzy boundaries are adjusted to the individual as the system learns the driver's individual biometrics and reactions to external factors. The fuzzy boundaries between conditions can overlap, e.g., when the system determines that the driver is in a "sleepy" or "distracted" biometric condition. When determining whether to create an alert or initiate a dialog stage, the system can use multiple factors, e.g., external factors, driving patterns, recent activity, to disambiguate the possible shift between biometric condition states.

In a second correlation stage, step 305, the CDDS correlates external factors with driving patterns. As part of this stage, in some embodiments of the invention, correlations between the external factors and the driver's biometric data are also correlated. As mentioned above, the external factors include factors that impact on driver performance, e.g., weather, traffic, road accidents, time of day. This stage accounts for differences in driving patterns which are due to external factors rather than the driver's biometric condition. A comparison of driving patterns with both predicted traffic and actual traffic, for example, will predict whether the driver performance is changed with the prospect of difficult traffic or whether only actual difficult traffic changes the individual driver's driving pattern. This stage is described in greater detail in reference to FIG. 7.

Once sufficient data is collected and correlations are learned or established, the CDDS will enter a driving stage where the driver is monitored for possible inattentiveness in step 307. In preferred embodiments of the invention, the data collection and correlation processes in steps 301, 303 and 305 can continue to refine the driver biometrics and driving pattern data during the driving stage as indicated by the dashed line returning to step 301. During the driving stage, the driver biometrics are monitored with wearable devices or vehicle provided devices and mapped to one of the driver condition categories. The CDDS assesses the driver condition according to the biometric data. In preferred embodiments of the invention, if the biometric data most closely fits any of the categories other than the "normal" condition, the CDDS triggers a personalized dialog relevant to that condition category. In embodiments of the invention, there is a threshold amount of time that the biometric data needs to match a non-normal category before the dialog is triggered.

In some preferred embodiments, the driving pattern is also monitored during the driving stage. In these embodiments, if the driving pattern most closely fits an "abnormal" driving pattern, the CDDS triggers a personal dialog.

In yet other preferred embodiments of the invention, the correlations for recent activity and external factors are used to determine whether the driver biometric data and/or driving pattern warrant triggering the personal dialog. For example, after a gym session, biometric data such as pulse and body temperature may be elevated, indicating that a higher range of biometric data should be used to determine the thresholds of the driver biometric condition category. Similarly, the thresholds between a normal driving pattern and an abnormal driving pattern are adjusted so that a greater range of driving patterns is considered to be a normal driving pattern. This results in a greater number of current driving patterns being determined consistent with the normal driving pattern than consistent with an abnormal driving pattern than if the threshold was not adjusted. This stage is described in greater detail in FIG. 8.

In step 309, an inattentive condition or other non-normal state is determined based on the driver condition, driving patterns, recent activities and external factors as appropriate for the particular embodiment of the invention.

The CDDS will enter into a dialog stage, step 311, in which it engages the driver in a personalized dialog. The personalized dialog helps the driver to overcome cognitive inattentiveness caused by sleepiness, tiredness, anxiety, stress and other conditions. As one example, the dialog system asks questions to engage the driver in a conversation to help the driver to overcome the current biometric condition. In a situation where the driver is stressed, the questions are selected to help the driver to calm down; in a situation where sleepiness is determined, involving the driver in an engaging dialog would help to overcome the sleepiness. The personal dialog, in preferred embodiments, is personalized both for the current driver condition and for driver history and preferences.

During the dialog stage, the CDDS analyzes the verbal responses of the driver and assesses the cognitive inattentiveness level. In preferred embodiments of the invention, the cognitive inattentiveness level is determined by the following factors: engagement with the dialog, response time, speech characteristics and accuracy of the driver responses. If the driver is not properly engaged in the dialog, for example, if the driver does not respond to some questions or is completely non-responsive, the CDDS may determine that the driver is inattentive and change the personalized dialog to a dialog which is more effective, or take other measures. The driver response time is indicative of the cognitive inattentiveness level. An inattentive driver will tend to have longer response times. The driver response times are compared with average response time either for an average driver or for the individual driver. Speech parameters or characteristics, for example, mumbled, slurred or quiet speech, may indicate a high inattentiveness level. The correctness of the driver answers to the questions is a measure of the driver's engagement with the dialog. For example, if the system asks a question related to external conditions and the driver answer does not match the external conditions or is on an entirely different subject, the system decides this is an indication of driver inattentiveness.

During the dialog stage, the CDDS evaluates the cognitive inattentiveness level and determines if any further actions are needed. If the dialog has been effective and the inattentiveness level has dropped, the system returns to monitoring the driving state (as indicated by the dashed line) or, if desired by the driver, continues the dialog. If the dialog has been ineffective, other actions can be taken, step 313. These actions can include an audible alert. For example, the audible alert could be a loud sound or a command to stop driving as it is not safe. In embodiments of the invention, the system can place a call to the emergency number. The emergency number could be a personal contact such as a friend or family member, or it could be an emergency responder's number, e.g., giving the police a description and a location of the vehicle. In alternative embodiments, the action is to proceed with further dialog questions, but changing them to a different subject matter to see if a new dialog is effective. The nature of the dialog changes in embodiments of the invention. After a threshold is reached, the system recommend actions for the driver, e.g., suggest nearby rest areas or motels to sleep, suggest nearby gas stations or restaurants to buy coffee with corresponding driving instructions. For a driver who is not feeling well, the system can direct the driver to the nearest drug store or emergency medical facility. This stage is described in greater detail with reference to FIG. 9.

When determining the inattentive condition which activates the dialog, step 309, or when determining that the inattentive condition has continued so that additional actions in step 313 are applied, the CDDS uses the established correlation patterns between traffic, road conditions and weather factors, the driver biometric conditions and driving patterns. For example, during morning rush hours and in heavy traffic, frequent stop/start car motions do not indicate an impaired driving pattern, but in light traffic during the weekend, frequent stop/start motions would indicate an impaired driving pattern or a sleepy biometric condition. The driver's biometric data may be elevated in heavy traffic and will need to be accounted for when categorizing the driver's biometric condition. As another example, rainy or foggy weather factors will tend to change both the driving pattern and the driver biometric data. In preferred embodiments of the invention, the CDDS assesses the driver's ability to drive safely. In doing so, the system considers the external factors as additional risk factors applied to the determined driver cognitive inattentiveness level. For example, if the system establishes that the driver cognitive inattentiveness level is close to the alert state, then external factors such as a long period of driving and bad weather would add additional scores to elevate the driver condition status to the alert threshold.

Figure 4:
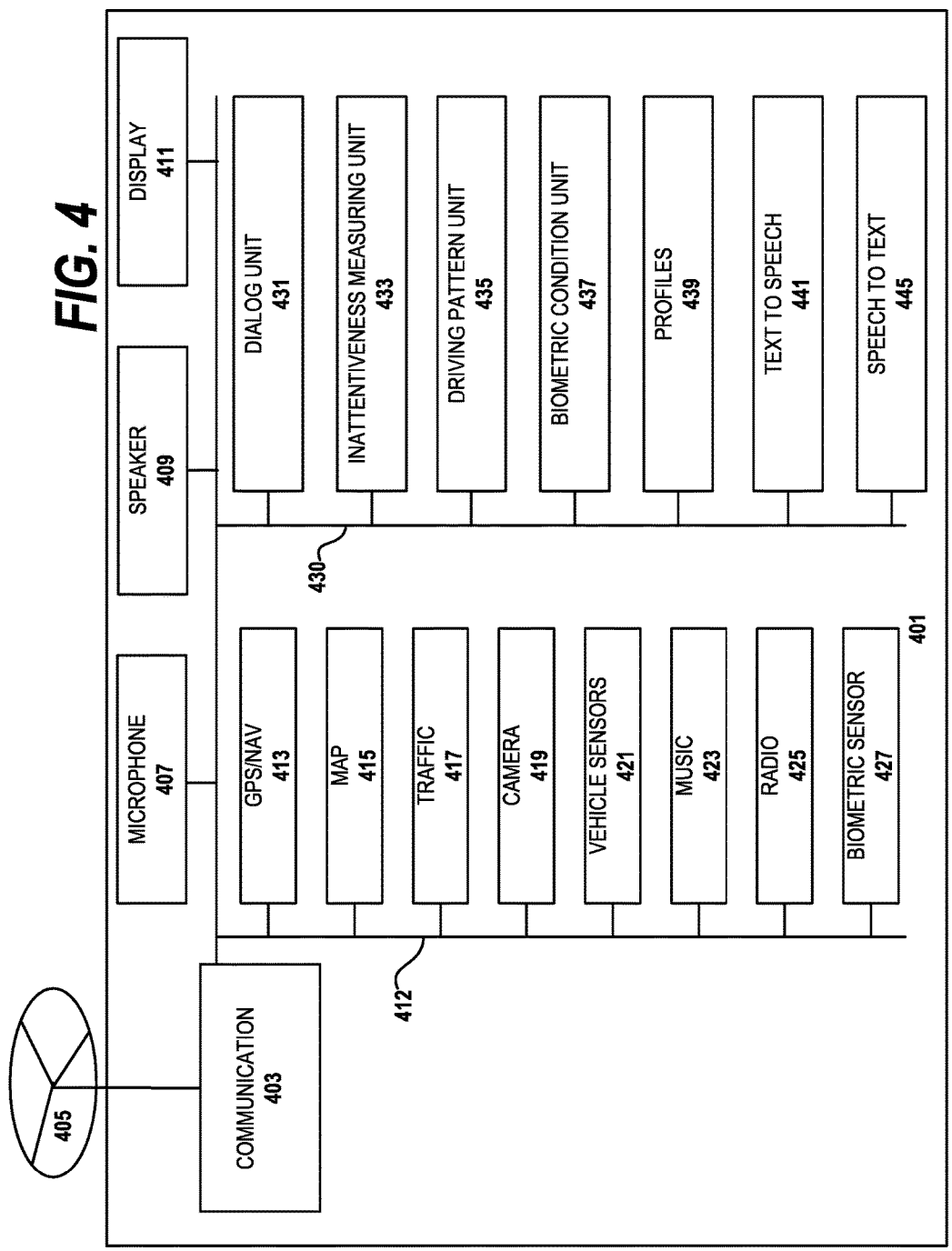
FIG. 4 illustrates an architectural diagram according to an embodiment of the invention.

FIG. 4 illustrates an architectural diagram according to an embodiment of the invention. In the vehicle 401, the system comprises a set of computer modules which are configured to carry out the functions of the invention. A communication control unit 403 and an antenna 405 connect the system units to external computing resources. The communication control unit 403 can use a cellular telephone network to connect to the Internet or other network by means of communication protocols such as TCP/IP (Transmission Control Protocol/Internet Protocol) to communicate with a server for information needed by the CDDS. For example, traffic and map updates, or customized dialogs may be downloaded from a server. These services can be provided by cloud services available to the CDDS through the communications unit 403. Further, cloud services can provide some of the functions which are depicted as on board function such as the dialog unit 431. Cloud services can provide other functions, for example, evaluating the risks of driving in the particular segment considering multiple factors such as accidents, road conditions, traffic level and so forth which can be used by the CDDS to adjust the fuzzy boundaries of the condition categories. The communication unit 403 can also include Bluetooth or other near field communication antenna and transmitter to communication with wearable devices which collect the driver biometric data.

The microphone 407, speaker 409 and display 411 provide the user interface for the driver. The microphone 407 is an input device for collecting the driver's speech and sending the speech to the dialog unit 431. The speaker 409 is an output device for providing the driver with the dialog output from the dialogue unit 431. The speaker 409 can be used for other functions such as providing navigation information from the GPS/navigation unit 413, traffic information from the traffic unit 417 or music information from the music playback unit 423 or the radio unit 425.

Shown coupled to the first bus 412 are the GPS (Global Positioning System)/navigation unit 413, a map database 415, a traffic information unit 417, a camera 128, a set of vehicle sensors 421, a set of music files and a music playback unit 423, a radio tuner 425 and a biometric sensor unit 427. The GPS/navigation unit 413 acquires GPS positioning information enabling navigation functions. The map database 415 is part of the GPS/navigation unit in alternative embodiments and stores map information including address information, road information, building information such as gas station or medical facility information which is useful in route guidance by the GPS/navigation unit 413 and the traffic information unit 417. The traffic information unit 417 acquires traffic information such as traffic jam information, traffic accident information, and construction information. As the traffic information dynamically changes with time, the traffic information unit 417 updates its information via the communication unit 403 and antenna 405. The traffic information is used for route guidance by the GPS/navigation unit 413 and notification of the traffic information to the driver via the speaker 409 or display 411.

The camera(s) 419 is used to detect unsafe driving patterns such as driving out of the lane or coming too close to other vehicles or road objects. The vehicle sensors 421 include other sensors such as radar or laser devices which measure distances from obstacles around the vehicle. The biometric sensor 427 is used for collecting biometric information about the driver. In some preferred implementations of the invention, the vehicle sensors and biometric sensors are devices which are separate from the CDDS and vehicle sensor block 421 and biometric sensor block 423 represent acquisition units for receiving the vehicle sensor and biometric sensor data. For example, biometric sensors are wearable devices in preferred embodiments of the invention. In some embodiments of the invention, output from both wearable and vehicle biometric devices are available to the CDDS.

Connected to the second bus 430 are dialog unit 431, inattentiveness measuring unit 433, driving pattern unit 435, biometric condition unit 437, profiles storage unit 439, text to speech unit 441 and speech to text unit 445. The dialog unit 431 carries out a dialog with the driver by using the text to speech unit 441 and the speech to text unit 445. When the inattentiveness of the driver passes a threshold as determined by the inattentiveness measuring unit 433, the dialog unit 431 carries out a personalized dialog with the driver. In preferred embodiments of the invention, the inattentiveness measuring unit 433 determines the cause of the inattention and selects a dialog to ameliorate a particular driver condition. In other embodiments of the invention, the inattentiveness measuring unit determines the driver condition and passes that information to the dialog unit which makes the dialog selection. Preferred dialogs can be stored in the profile database 439, or may be constructed in real-time by a server (not shown) with which the dialog unit 431 in communication via the communication unit 403.

The inattentiveness measuring unit 433 measures the driver's condition by collecting driving pattern data and biometric condition data from the driving pattern unit 435 and biometric condition unit 437 respectively. The dialog unit 431 can augment the findings of the inattentiveness measuring unit 433, driving pattern unit 435 and biometric condition unit 437 by asking the driver about his condition. This information can be used to improve the correlations as well as select the correct dialog.

Figure 5:
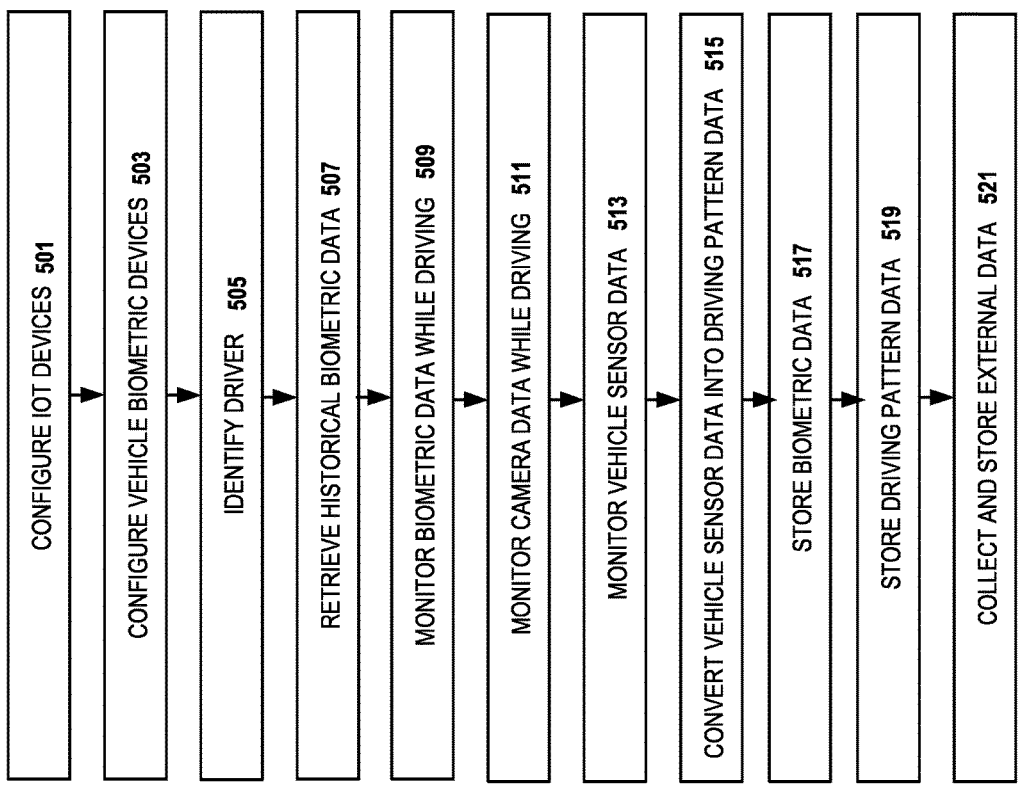
FIG. 5 illustrates a flow diagram of a data collection stage according to an embodiment of the invention.

FIG. 5 illustrates a flow diagram of a data collection stage according to an embodiment of the invention. The data collection stage may include a registration or configuration stage. In step 501, the driver configures the IoT devices which are to be used to provide the biometric data. This step includes Bluetooth pairing, adding a particular device to a driver's profile as well as excluding devices from providing certain types of information, e.g., contact information, or any information from a particular device. By adding a device to a driver's profile, when the device is next sensed the CDDS knows that the particular driver has entered the car. Multiple drivers can have their own profiles with the CDDS. Next, in step 503, the system allows the driver to configure any vehicle biometric devices. In step 505, the system identifies the driver. As mentioned above, this can be accomplished by sensing a set of registered devices entering the vehicle. In preferred embodiments of the invention, the dialog system may prompt the driver with an audio cue, e.g., "Hello, James, are you driving today?" to confirm the identity of the driver. A cue can be useful in embodiments where more than one driver uses the same vehicle, and two sets of IoT devices are sensed entering the vehicle at the same time.

Next, the data collection for the current session commences. In step 507, the CDDS retrieves the recent historical biometric data from the registered IoT devices to determine whether the driver has recently performed activities which would change the biometric information collected during driving: in the gym, stressed, inactive, just woken. The dialog unit can be used to confirm the activity with the driver. "James, it looks like you just exercised." The GPS/navigation unit or a schedule downloaded from an IoT device can also be used to confirm the activity in other embodiments. For example, the GPS/navigation unit may show that the driver is entering the vehicle in close proximity to the gym or the schedule may have an activity listed. In step 509, the CDDS retrieves biometric data while driving, both from the registered IoT devices and the vehicle provided devices, if any. As mentioned above, such wearable devices collect various biometrical metrics such as pulse, pressure, and body temperature from the driver and which will be used to categorize the driver's biometric condition, e.g., alert, stressed, tired or inattentive.

The data collection stage also collects the data needed to categorize the driving pattern. In step 511, the system retrieves camera data to determine whether the driver is staying in the correct lane, and maintain a safe distance from other vehicles. In step 513, the CDDS retrieves vehicle sensor data to determine whether the driver operating the vehicle safely, maintaining a proper speed, hitting the brakes too often, maintaining a proper direction by steering and so forth. In step 515, the collected sensor data is converted into a driving pattern. The system stores the biometric data, step 517, and driving pattern data, step 519, for use in later stages of the process.

In step 521, in some embodiments, external data such as time, weather, road conditions, predicted traffic and actual traffic are also gathered and stored in the data collection stage either by consulting with cloud based services or from vehicle sensors.

Figure 6:
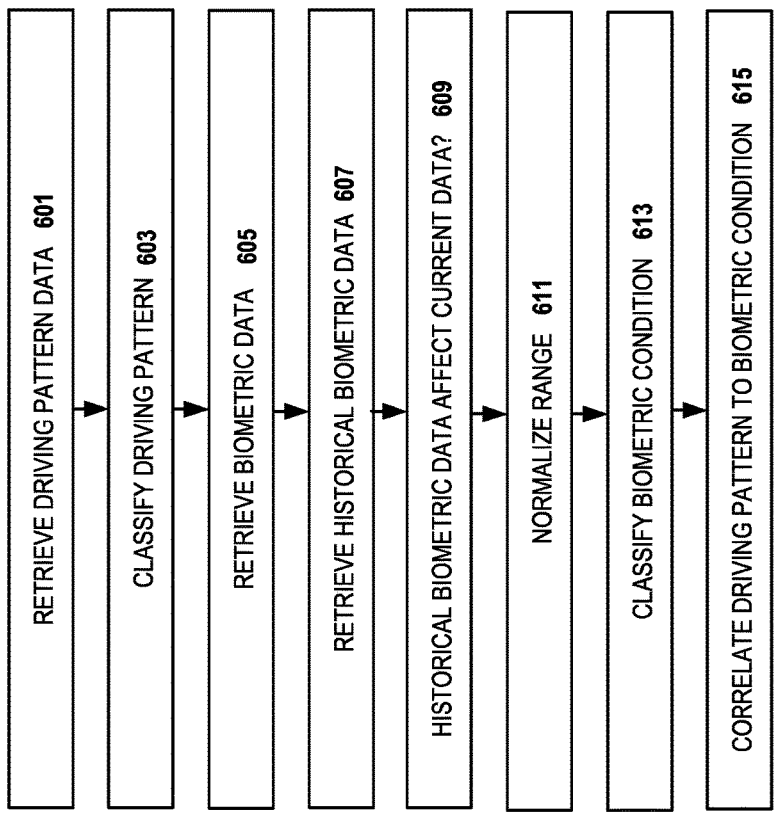
FIG. 6 illustrates a flow diagram of creating correlations between driving pattern state with the biometric condition according to an embodiment of the invention.

FIG. 6 illustrates a flow diagram of creating correlations between the driving pattern and the biometric condition according to an embodiment of the invention. In step 601, the CDDS retrieves the collected driving pattern data. In step 603, the system classifies the driving pattern. Driving patterns can be classified as belonging to certain states such as: normal state, sleepiness state, erratic driving state, agitated driving state. The driving pattern states are based on an individual profile of the specific driver in the specific car in some embodiments. In other embodiments, the currently sensed individual driver driving pattern is matched to a closest one of a set of generalized driving pattern profiles of multiple drivers. In yet other embodiments, the generalized driving pattern profiles are used as base driving patterns to start the correlation process, and then the captured driving patterns are used to customize the driving patterns to the individual driver.

In step 605, the CDDS retrieves the biometric data which has been collected. In preferred embodiments of the invention, step 607, this includes retrieving historical biometric data to determine (step 609) whether the historical biometric data affects the current biometric data. If so, in step 611, the system normalizes the range of current biometric data so that the current biometric condition can be correctly classified, step 613. In alternative embodiments of the invention, rather than normalizing the current biometric data, the threshold conditions between normal and abnormal biometric conditions are adjusted. In preferred embodiments of the invention, the biometric data of the driver are monitored during his/her regular activities: short driving, long driving, gym, work, sleep and awakening. The CDDS determines whether a recent activity has an effect on the biometric data received while driving and how long that effect may be. In this way, the system establishes a set of "normal" biometric metrics for each recent activity. In preferred embodiments of the invention, the set of normal metrics will identify the biometric ranges for "normal" conditions, as well as stress conditions, sickness conditions, sleepiness conditions, anxiety conditions as well as other categories of conditions. In preferred embodiments of the invention, the system will ask the driver to verbally confirm his or her biometric condition.

The CDDS will correlate the driving pattern state with the biometric condition in step 615. As an example on one correlation method, for driver A, the system learns the mapping between the driving pattern from the sensor data and biometric conditions of driver A:

Driving pattern data: {value1,value2,value3} condition=normal
Driving pattern data: {value1,value2,value3} condition=stressed
System learns the correlation for driver A expressed in the fuzzy rule:
if (BRAKING_PATTERN=start/stop and STEERING=twitchy) then (condition=stressed)

While different embodiments of the invention use different formats for the biometric data and driving pattern data, as mentioned above, some preferred embodiments use fuzzy variables or condition boundaries to determine system categories such as driver conditions, attentiveness level and driving patterns. When a fuzzy variable is used to determine that the driver is in a "normal condition", or abnormal conditions such as a "sleepy" condition or a "stressed" condition, the value of the variable, e.g., of a biometric condition, lies in a probable range defined by quantitative limits established in the learning stage. The system logic operates based on these fuzzy variables. The variable values and variable ranges are defined based on average statistical data and then adjusted for the particular individual. The numerical data collected from various sensors are normalized so that the values can be used in simple computations including comparisons. In these embodiments, the fuzzy variables in the system processing engine are defined using fuzzy rules and decision tree algorithms. Decision trees are popular method on building if-then rules. Decision trees are used in a non-parametric supervised learning method used for classification and regression. Thus, a model is created that predicts the value of a target variable by learning simple decision rules inferred from the data features.

Figure 7:
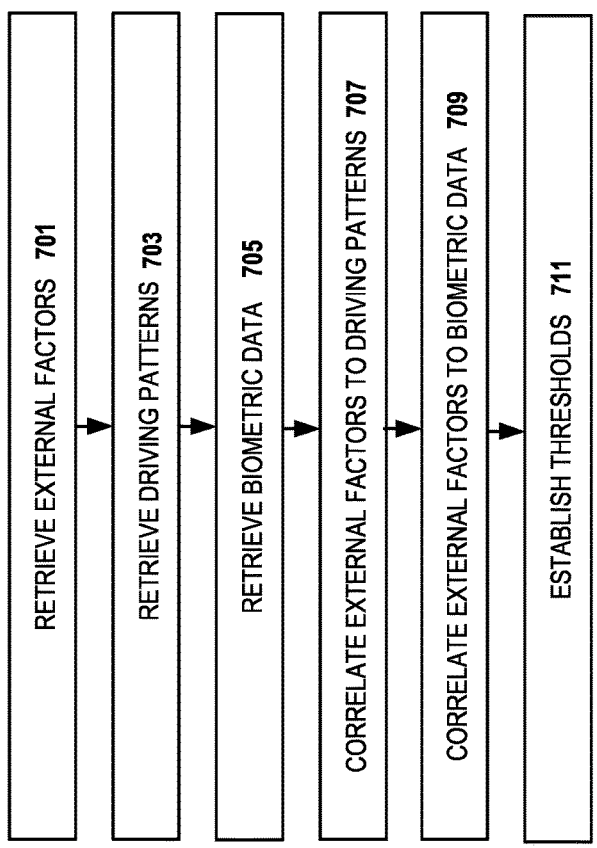
FIG. 7 illustrates a flow diagram of CDDS correlating external factors with driving patterns according to an embodiment of the invention.

As illustrated in FIG. 7, in a second correlation stage, the CDDS correlates external factors with driving patterns. As part of this stage, in some embodiments of the invention, the CDDS also correlates the external factors and the driver's biometric data. In step 701, the CDDS retrieves external factors that impact on the driver performance, e.g., weather, traffic, road accidents, time of day. In step 703, the system retrieves the stored driving patterns and in step 705, it retrieves the stored biometric data. In step 707, the CDDS correlates external factors to driving patterns. This stage accounts for differences in driving patterns which are due to external factors rather than the driver's biometric condition. A comparison of driving patterns with both predicted traffic and actual traffic, for example, will predict whether the driver performance is changed with the prospect of difficult traffic or whether only actual difficult traffic changes the individual driver's driving pattern. As an example, one correlation method for driver A, the system learns the mapping between the external factor data and conditions of driver A:

External factor data: {value1,value2,value3} condition=normal
External factor data: {value1,value2,value3} condition=stressed The system learns the correlation for driver A expressed in the fuzzy rule:
if (DATE_TIME=night and WEATHER=rain) then (condition=stressed)

In step 709, system correlates external factors to biometric data. This stage will determine whether the driver's biometric data changes with external factors, e.g., difficult traffic or weather conditions. If so, in step 711, the system will establish different thresholds for the biometric conditions given different external factors.

In some embodiments of the invention, a machine learning algorithm can be used to make correlations or predictions. A machine learning algorithm requires a sufficient amount of data to be employed successfully. When a machine learning algorithm is used one suitable method is decision tree learning. Decision tree learning utilizes a decision tree as a predictive model which maps observations about an item (represented in the branches) to conclusions about the item's target value (represented in the leaves). For example, using the fuzzy ruleset and the data collected for the particular driver, the following ruleset can be employed in embodiments of the invention:

Given (condition of the driver=very sleepy) AND (road conditions=risky) AND (driver attentiveness level>threshold+delta) AND (driver health=high temperature) THEN (System action=issue the Dialag with CVS route)

Figure 8:
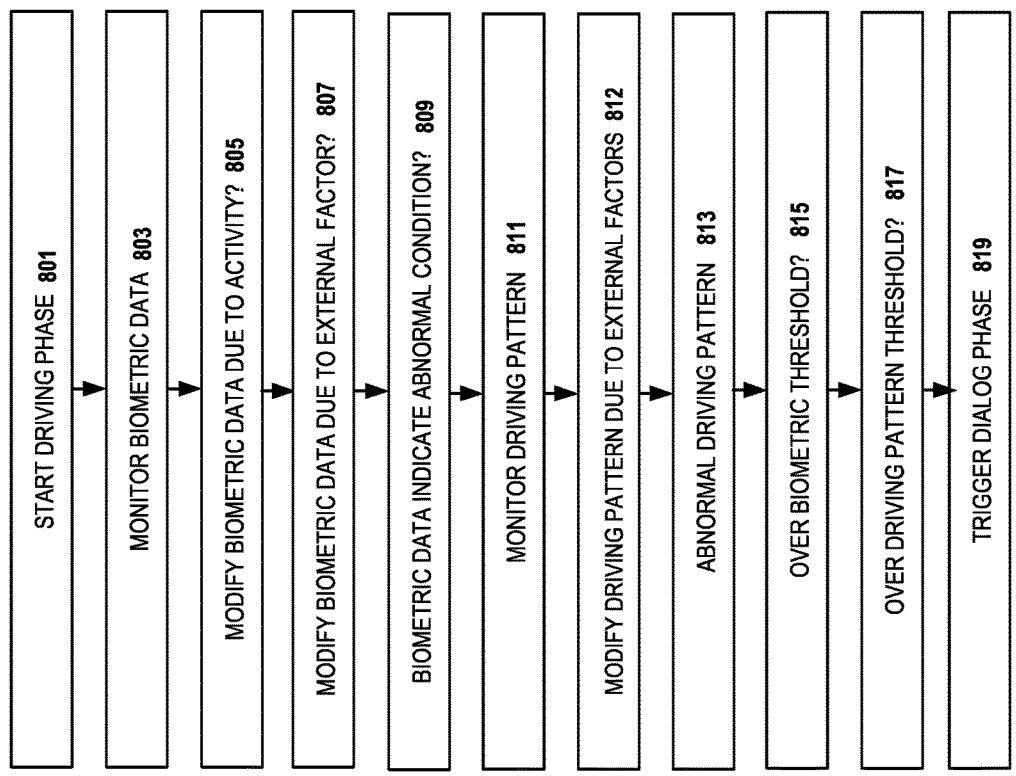
FIG. 8 illustrates a flow diagram of a driving stage according to symptoms according to another embodiment of the invention.

In FIG. 8, the driving stage in preferred embodiments of the invention is illustrated. Once sufficient data is collected and correlations made, the CDDS will start a driving stage where the driver is monitored for possible inattentiveness in step 801. In step 803, the system monitors the current biometric data through the wearable devices and/or vehicle provided devices. In preferred embodiments of the invention, the system determines in step 805 whether the current biometric data should be modified due to a recent activity. As mentioned above, the thresholds for determining a given biometric condition can be adjusted given recent activities such as working out at the gym or just waking. For example, after an exercise session, biometric data such as pulse and body temperature may be elevated, indicating that a higher range of biometric data should be used as boundaries when fitting the driver into a biometric condition category. In step 807, the CDDS decides whether to modify the current biometric data due to external factors. A driver's biometric data may be elevated due to difficult driving conditions and hence the thresholds used to determine a given biometric condition would be adjusted. In step 809, the CDDS determines whether the current biometric data, as adjusted, indicates an abnormal driver condition based on the different biometric condition profiles.

In step 811, the system monitors the current driving pattern by converting the vehicle sensor data into a current driving pattern and comparing the current driving pattern to the "normal" and "abnormal" driving patterns stored by the CDDS. In step 812, the system determines whether the driving pattern should be adjusted because of external factors. In step 813, the system determines in view of the external factors whether an abnormal driving pattern can be detected. For example, in heavy traffic, start/stop driving patterns and sudden steering motions may be perfectly normal. If either the biometric data, in step 815, is over a biometric threshold indicating an abnormal condition or in step 817, the current driving pattern is over the normal driving pattern threshold, in step 819, the system triggers the dialog stage. In this embodiment, the biometric data and driving pattern tests serve as dual indicators whether the dialog stage should be entered. However, in alternative embodiments, because the biometric data and driving patterns have been correlated to indicate the same driver condition, one or the other test are used. In preferred embodiments of the invention, if the biometric data most closely fits any of the categories other than the "normal" condition, the CDDS triggers a personalized dialog relevant to that condition/category. In embodiments of the invention, there is a threshold amount of time that the biometric data match a non-normal category. In some preferred embodiments, the driving pattern is also monitored during the driving stage. If the driving pattern most closely fits a "non-normal" driving pattern, the CDDS can trigger a personal dialog.

Figure 9:
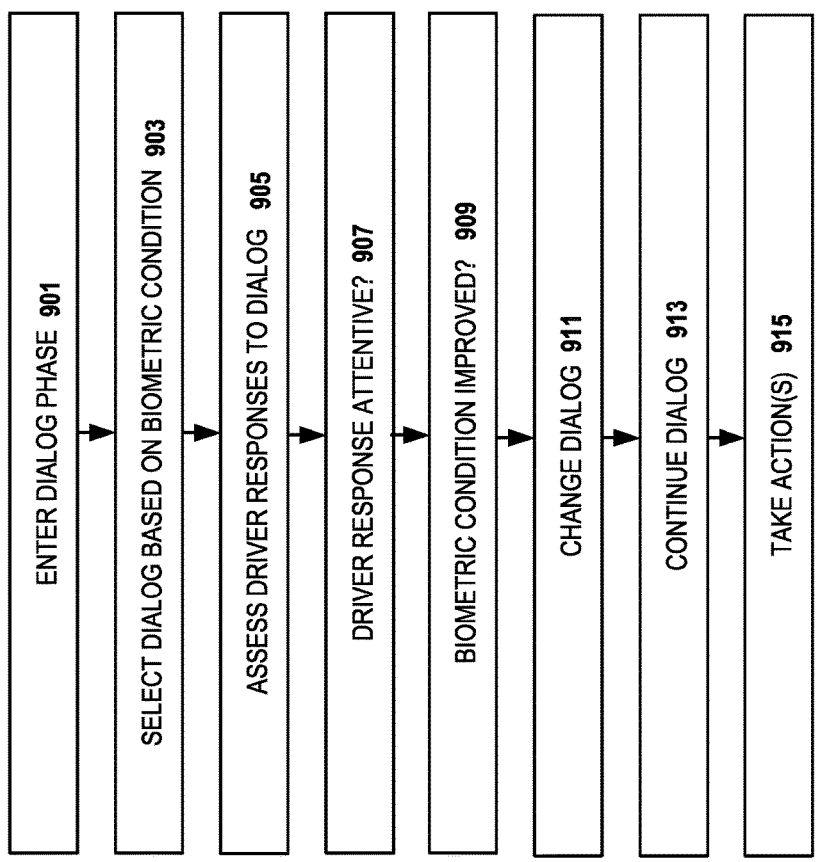
FIG. 9 is a flow diagram of a dialog stage according to another embodiment of the invention.

In FIG. 9, the flow diagram for preferred embodiments of the invention is illustrated. The CDDS will enter into the dialog stage to engage the driver in a personalized dialog. The personalized dialog is selected to help the driver to overcome cognitive inattentiveness caused by the sleepiness, tiredness, anxiety, stress and other conditions. The system starts in step 901, when it enters the dialog stage. In step 903 the CDDS selects the personalized dialog based on currently sensed biometric condition as well as any driver history and preferences. The system asks questions to engage the driver in a conversation to help the driver to overcome the current biometric condition. For example, in a situation where the driver is stressed, the questions are selected to help the driver to calm down. On the other hand, if a "sleepiness" biometric condition is determined, involving the driver in an engaging personalized dialog would help to overcome the sleepiness.

In step 905, the system assess driver responses to dialog. During the dialog stage, the CDDS analyzes the responses of the driver and assesses the cognitive inattentiveness level. In preferred embodiments of the invention, the cognitive inattentiveness level is determined by the following factors: engagement with the dialog, response time, speech characteristics and accuracy of the driver responses. In preferred embodiments of the invention, the driver's responses can be evaluated by a tone analyzer to detect if the driver is angry, sad, agitated or another emotion corresponding to one of the biometric conditions.

In step 907, the system determines whether the driver response was "attentive" or "inattentive". If the driver does not respond to some questions or is completely non-responsive, the CDDS may determine that the driver is not attentive. The driver response time is indicative of the cognitive inattentiveness level as an inattentive driver will tend to have longer response times. Speech parameters or characteristics, for example, mumbled, slurred or quiet speech, may indicate a high inattentiveness level. The correctness of the driver answers to questions is a measure of the driver's engagement with the dialog. For example, if the system asks the question related to external conditions and the driver answer does not match the external conditions or is on an entirely different subject, this is an indication of driver inattentiveness.

In step 909, the system establishes whether the driver's biometric condition improved, e.g., by evaluating the responses to the dialog and/or by comparing the current biometric condition to the biometric profiles. If not, in step 911, the CDDS may determine that the driver is still not attentive and change the personalized dialog to a dialog which is more effective, in step. If the dialog has been effective and the inattentiveness level has dropped, the system returns to monitoring the driving state or if desired by the driver continues the dialog, in step 913.

If the dialog has been ineffective, other actions can be taken, step 915. As mentioned above, these actions can include an audible alert. For example, the audible alert could be a loud sound or a command to stop driving as it is not safe. In embodiments of the invention, the system can place a call to the emergency number. The emergency number could be a personal contact such as a friend or family member, or it could to emergency responders, e.g., giving the police a description and location of the vehicle. In alternative embodiments, the system recommends actions for the driver, e.g., suggest nearby rest areas or motels to sleep, suggest nearby gas stations, coffee shops or restaurants to buy coffee to wake up with corresponding driving instructions. For a driver who is not feeling well, the system can direct the driver to the nearest drug store or emergency medical facility.

As an example of how the system would be used, suppose driver A starts driving after a stressful workday and late at night and biometric sensors processing module reports the driver's biometric condition level="near stressful". The system assigns the current condition to be near the threshold of safely driving. In the example, a GPS sensor feeds the system data that the car, and thus the driver, has been at the work location for over 12 hours. Given the recent activity information, the system adjust the threshold so that with the adjusted threshold the system now finds the current biometric condition="reached the threshold". In response, the system selects the calming dialog and then, optionally selects other actions. After starting the cognitive dialog, the system detects the level of cognitive responses are low. The system analyzes the weather data and determines it is about to start raining along the driver's predicted route home. Therefore, the system predicts a very high risk of poor driving for the driver A and selects additional actions designed to return the driver to a normal biometric condition.

As another example of how the system would be used, the system detects an "ANGRY" biometric condition by analyzing the sensor data from the wearable IoT device of the driver, and therefore, invokes a dialog that is designed to alleviate the angry state and bring the driver back to the normal biometric state. The CDDS evaluates the driver answers and confirms the angry biometric condition. At this point, the system already has the knowledge that when this driver is ANGRY it will most likely trigger an erratic driving pattern. Further, the system detects that driver reached the safety driving threshold, i.e. the driving pattern is erratic and abnormal. Because the driver has passed both the biometric condition and driving pattern thresholds as well as having the ANGRY state confirmed by the dialog system, the CDDS performs an additional set of actions, e.g., changing the dialog, making external alarms and recommendations to the driver. An embodiment of the invention will triggers the additional set of actions, if only one of the thresholds is crossed, e.g., the biometric threshold is crossed, but before the change in driving pattern occurs, because of the known correlation between the "ANGRY" biometric condition and the erratic driving pattern.

In another embodiment of the invention, the safety threshold is cumulative, having biometric condition, driving pattern, recent activity and external factor components. In this way, the components are additive and a contribution from each of the factors may cumulatively indicates that the driver is at his safety threshold. The components may also adjust the safety threshold itself. For example, a recent activity of exercise may adjust the biometric component upwards so that the cumulative safety threshold is also higher. As an another example, an external factor data set may indicate a current or impending danger which would lower the cumulative safety threshold so that biometric conditions and driving patterns which are still within the normal conditions, but close to the standard thresholds will now cross the cumulative safety threshold in view of the danger. The goal of system is to evaluate all the factors that are likely to impact the safety of driving and be able to predict the safety driving threshold for the driver in the particular situation Cloud Computing Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models, all as more particularly described and defined in "Draft NIST Working Definition of Cloud Computing" by Peter Mell and Tim Grance, dated Oct. 7, 2009.

In particular, the following are typical characteristics:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The Service Models typically are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The Deployment Models typically are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes. A representative cloud computing node is as illustrated in FIG. 2 above. In particular, in a cloud computing node there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed cloud computing environments where tasks are performed by remote processing devices that are linked through a communications network. In a distributed cloud computing environment, program modules may be located in both local and remote computer system storage media including memory storage devices.

Figure 10:
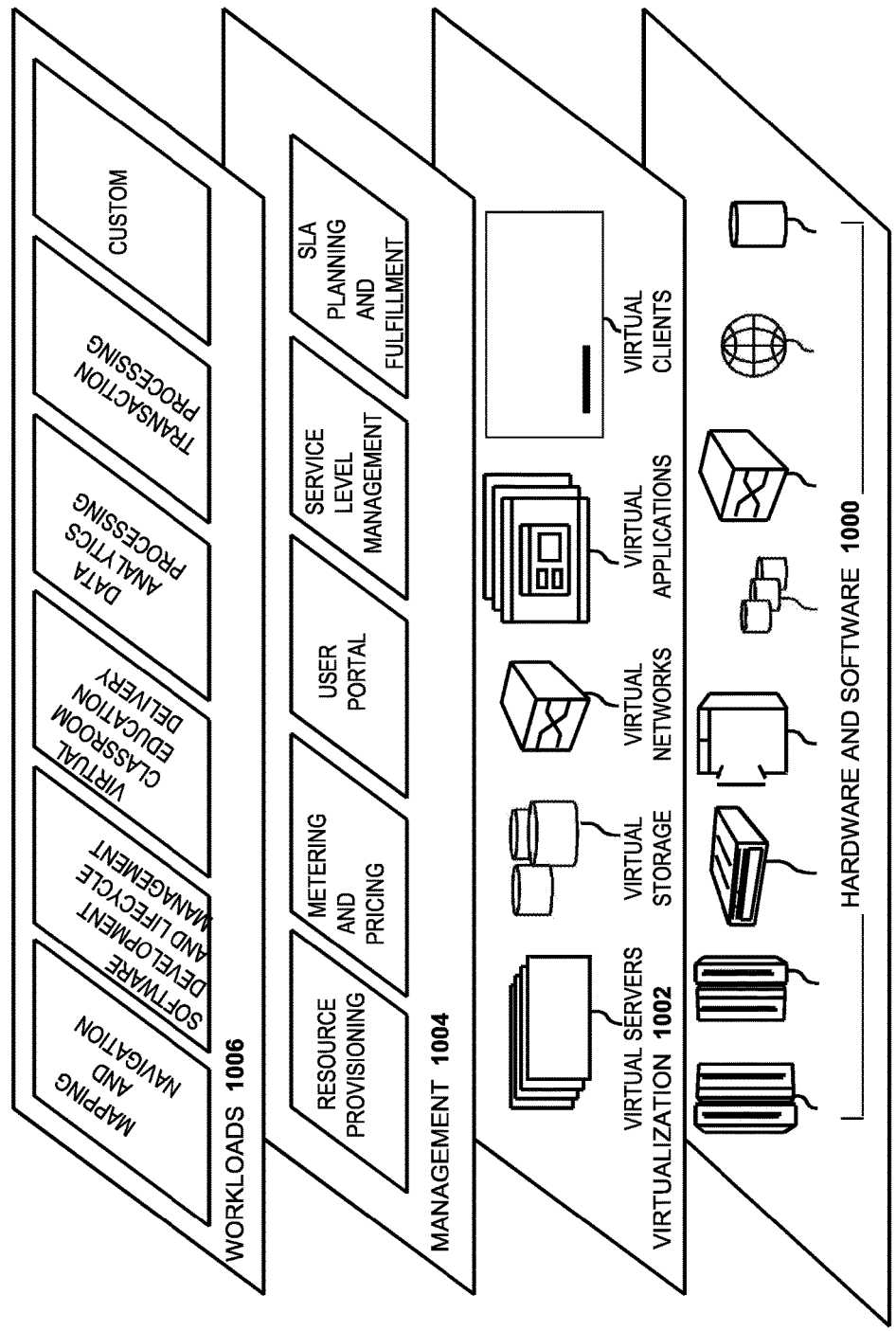
FIG. 10 is a diagram of a cloud environment in which the present invention can be implemented.

Referring now to FIG. 10, by way of additional background, a set of functional abstraction layers provided by a cloud computing environment is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1000 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 1002 provides an abstraction layer from which the following examples of virtual entities may be provided: virtual servers; virtual storage; virtual networks, including virtual private networks; virtual applications and operating systems; and virtual clients.

In one example, management layer 1004 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 1006 provides examples of functionality for which the cloud computing environment may be utilized. Examples of workloads and functions which may be provided from this layer include: mapping and navigation; software development and lifecycle management; virtual classroom education delivery; data analytics processing; transaction processing; and others (e.g., enterprise-specific functions in a private cloud).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

The present invention has many advantages over the prior art. Embodiments of the invention provide a dynamically updated the awareness thresholds for the particular person. The embodiments assess a multi-factor estimation of the driver's attentiveness level based on the historical and current biometric data and on comparison with real time, current driving patterns. The current biometric and driving pattern data are normalized based on the recent activity and current external factors. Preferred embodiments of the invention integrate various data sources through a shared data repository platform such as IoT or cloud environments. The real time estimation of the driver inattentiveness level is adjusted with data from various data sources related to the relevant risk factors. By using a shared data platform, embodiments of the invention provides more accurate and confident estimates for the driver's ability to drive safely. Using the personalized dialog system, another estimate of driver ability is provided as well as a natural means of providing both recommendations to the driver and ameliorating the driver condition.

While a preferred operating environment and use case has been described, the techniques herein may be used in any other operating environment in which it is desired to deploy services.

As has been described, the functionality described above may be implemented as a standalone approach, e.g., one or more software-based functions executed by one or more hardware processors, or it may be available as a managed service (including as a web service via a SOAP/XML or RESTful interface). The particular hardware and software implementation details described herein are merely for illustrative purposes are not meant to limit the scope of the described subject matter.

More generally, computing devices within the context of the disclosed subject matter are each a data processing system comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF).

In addition to the cloud-based environment, the techniques described herein may be implemented in or in conjunction with various server-side architectures including simple n-tier architectures, web portals, federated systems, and the like.

Still more generally, the subject matter described herein can take the form of an entirely hardware embodiment, an entirely software embodiment or an embodiment containing both hardware and software elements. In a preferred embodiment, the module functions are implemented in software, which includes but is not limited to firmware, resident software, microcode, and the like. Furthermore, the interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the techniques are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

In the preferred embodiment, the functionality provided herein is implemented as an adjunct or extension to an existing cloud compute deployment management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

Having described our invention, what we now claim is as follows.

The invention claimed is:

1. A computer implemented method for driving safety comprising:
   gathering a current set of biometric data of a vehicle driver from an Internet of Things (IoT) device during a driving phase, wherein the current set of biometric data comprises current values for dynamic biometric data indicating a biometric condition;

gathering a set of external factor data from a cloud resource during the driving phase, wherein the set of external factor data comprises values for external factors that may impact vehicle driver performance;

adjusting a threshold value for a first threshold between a normal biometric condition and a first abnormal biometric condition for the vehicle driver for a first biometric parameter according to the set of external factor data;

determining whether the gathered biometric data of the vehicle driver is consistent with the normal biometric condition or the first abnormal biometric condition according to the adjusted first threshold value; and responsive to a determination that the gathered biometric data is consistent with the first abnormal biometric condition, performing a selected one of a set of actions, the selected action designed to alleviate the first abnormal biometric condition.

2. The method as recited in claim 1, further comprising:

gathering a current driving pattern from a vehicle sensor during the driving phase;

adjusting a threshold value for a second threshold between a normal driving pattern and a first abnormal driving pattern for the vehicle driver for according to the set of external factor data;

determining whether the current driving pattern of the vehicle driver is consistent with the normal driving pattern or the first abnormal driving pattern according to the adjusted second threshold value; and responsive to a determination that the current driving pattern is consistent with the first abnormal driving condition, performing a selected one of the set of actions.

3. The method as recited in claim 1, wherein the selected action is to perform a dialog with the vehicle driver designed to bring the vehicle driver into the normal biometric condition.

4. The method as recited in claim 3, wherein the first abnormal biometric condition is a member of a plurality of inattentive conditions and the method further comprises selecting the dialog with the vehicle driver for the first abnormal biometric condition from a set of dialogs, each dialog of the set of dialogs designed to bring the vehicle driver to the normal biometric condition from a respective one of the plurality of inattentive conditions.

5. The method as recited in claim 2, wherein the external factor data is selected from the group consisting of traffic factor data, weather factor data and road condition data.

6. The method as recited in claim 1, wherein the external factor data indicates a presence of a negative external factor and wherein the adjusting the threshold value for the first threshold between the normal biometric condition and the first abnormal biometric condition for the vehicle driver adjusts the value for the first biometric parameter to a higher value.

7. The method as recited in claim 2, wherein the external factor data indicates a presence of a negative external factor and wherein the adjusting the threshold value for the second threshold between the normal driving pattern and the first abnormal driving pattern for the vehicle driver results in a greater range of current driving patterns determined to be a normal driving pattern.

8. The method as recited in claim 1, wherein the external factor data is traffic factor data indicating an accident along a planned route and the method further comprises:

predicting that the vehicle driver biometric condition will increase above the adjusted first threshold value; and performing a selected one of a set of actions to alleviate the first abnormal biometric condition.

9. Apparatus, comprising:

a processor;

an Internet of Things (IoT) device;

a communications control unit;

computer memory holding computer program instructions executed by the processor for driving safety, the computer program instructions comprising:

program code, operative to gather a current set of biometric data of a vehicle driver from the Internet of Things (IoT) device during a driving phase, wherein the current set of biometric data comprises current values for dynamic biometric data indicating a biometric condition;

program code, operative to gather a set of external factor data from a cloud resource via the communications control unit during the driving phase, wherein the set of external factor data comprises values for external factors that may impact vehicle driver performance;

program code, operative to adjust a threshold value for a first threshold between a normal biometric condition and a first abnormal biometric condition for the vehicle driver for a first biometric parameter according to the set of external factor data;

program code, operative to determine whether the gathered biometric data of the vehicle driver is consistent with the normal biometric condition or the first abnormal biometric condition according to the adjusted first threshold value; and program code responsive to a determination that the gathered biometric data is consistent with the first abnormal biometric condition, operative to perform at least a selected one of a set of actions, the selected action designed to alleviate the first abnormal biometric condition.

10. The apparatus as recited in claim 9, further comprising:

program code, operative to gather a current driving pattern from a vehicle sensor during the driving phase;

program code, operative to adjust a threshold value for a second threshold between a normal driving pattern and a first abnormal driving pattern for the vehicle driver for according to the set of external factor data;

program code, operative to determine whether the current driving pattern of the vehicle driver is consistent with the normal driving pattern or the first abnormal driving pattern according to the adjusted second threshold value; and program code responsive to a determination that the current driving pattern is consistent with the first abnormal driving condition, operative to perform a selected one of the set of actions.

11. The apparatus as recited in claim 9, wherein the selected action is to perform a dialog with the vehicle driver designed to bring the vehicle driver into the normal biometric condition.

12. The apparatus as recited in claim 10, wherein the first abnormal biometric condition is a member of a plurality of inattentive conditions and the method further comprises selecting the dialog with the vehicle driver for the first abnormal biometric condition from a set of dialogs, each dialog of the set of dialogs designed to bring the vehicle driver to the normal biometric condition from a respective one of the plurality of inattentive conditions.

13. The apparatus as recited in claim 9, wherein the external factor data indicates a presence of a negative external factor and wherein the adjusting the threshold value for the first threshold between the normal biometric condition and the first abnormal biometric condition for the vehicle driver adjusts the value for the first biometric parameter to a higher value.

14. The apparatus as recited in claim 10, wherein the external factor data indicates a presence of a negative external factor and wherein the adjusting the threshold value for the second threshold between the normal driving pattern and the first abnormal driving pattern for the vehicle driver results in a greater range of current driving patterns determined to be a normal driving pattern.

15. A computer program product in a non-transitory computer readable storage medium for use in a data processing system, the computer program product holding computer program instructions executed by the data processing system for driving safety, the computer program instructions comprising:
   program code, operative to gather a current set of biometric data of a vehicle driver from an Internet of Things (IoT) device during a driving phase, wherein the current set of biometric data comprises current values for dynamic biometric data indicating a biometric condition;
   program code, operative to gather a set of external factor data from a cloud resource during the driving phase, wherein the set of external factor data comprises values for external factors that may impact vehicle driver performance;
   program code, operative to adjust a threshold value for a first threshold between a normal biometric condition and a first abnormal biometric condition for the vehicle driver for a first biometric parameter according to the set of external factor data;
   program code, operative to determine whether the gathered biometric data of the vehicle driver is consistent with the normal biometric condition or the first abnormal biometric condition according to the adjusted first threshold value; and
   program code responsive to a determination that the gathered biometric data is consistent with the first abnormal biometric condition, operative to perform at least a selected one of a set of actions, the selected action designed to alleviate the first abnormal biometric condition.

16. The computer program product as recited in claim 15, further comprising:
   program code, operative to gather a current driving pattern from a vehicle sensor during the driving phase;
   program code, operative to adjust a threshold value for a second threshold between a normal driving pattern and a first abnormal driving pattern for the vehicle driver for according to the set of external factor data;
   program code, operative to determine whether the current driving pattern of the vehicle driver is consistent with the normal driving pattern or the first abnormal driving pattern according to the adjusted second threshold value; and
   program code responsive to a determination that the current driving pattern is consistent with the first abnormal driving condition, operative to perform a selected one of the set of actions.

17. The computer program product as recited in claim 15, wherein the selected action is to perform a dialog with the vehicle driver designed to bring the vehicle driver into the normal biometric condition.

18. The computer program product as recited in claim 15, wherein the first abnormal biometric condition is a member of a plurality of inattentive conditions and the method further comprises selecting the dialog with the vehicle driver for the first abnormal biometric condition from a set of dialogs, each dialog of the set of dialogs designed to bring the vehicle driver to the normal biometric condition from a respective one of the plurality of inattentive conditions.

19. The computer program product as recited in claim 15, wherein the external factor data indicates presence of a negative external factor and wherein the adjusting the threshold value for the first threshold between the normal biometric condition and the first abnormal biometric condition for the vehicle driver adjusts the value for the first biometric parameter to a higher value.

20. The computer program product as recited in claim 16, wherein the external factor data indicates a presence of a negative external factor and wherein the adjusting the threshold value for the second threshold between the normal driving pattern and the first abnormal driving pattern for the vehicle driver results in a greater range of current driving patterns determined to be a normal driving pattern.

* * * * *